United States Patent
Tan et al.

(10) Patent No.: US 10,061,497 B2
(45) Date of Patent: Aug. 28, 2018

(54) METHOD, DEVICE AND STORAGE MEDIUM FOR INTERCHANGING ICON POSITIONS

(71) Applicant: Xiaomi Inc., Beijing (CN)

(72) Inventors: Kangxi Tan, Beijing (CN); Xin Liang, Beijing (CN); Xingmin Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 158 days.

(21) Appl. No.: 15/163,239

(22) Filed: May 24, 2016

(65) Prior Publication Data

US 2017/0131878 A1    May 11, 2017

(30) Foreign Application Priority Data

Nov. 5, 2015 (CN) .......................... 2015 1 0745112

(51) Int. Cl.
*G09G 5/00* (2006.01)
*G06F 3/0484* (2013.01)
(Continued)

(52) U.S. Cl.
CPC ...... *G06F 3/04845* (2013.01); *G06F 3/04817* (2013.01); *G06F 3/04883* (2013.01); *G06F 2203/04808* (2013.01)

(58) Field of Classification Search
CPC ............... G06F 3/0486; G06F 3/04842; G06F 3/04883; G06F 3/0482; G06F 3/0488; G06F 3/04845; G06F 3/04817; G06F 3/04808

See application file for complete search history.

(56) References Cited

U.S. PATENT DOCUMENTS 8,578,294 B2 * 11/2013 Eom ..................... G06F 3/0482
715/769
9,104,309 B2   8/2015 Tseng et al.
(Continued)

FOREIGN PATENT DOCUMENTS

CN    102279695 A    12/2011
CN    202110523 U    1/2012
(Continued)

OTHER PUBLICATIONS

International Search Report in International Applicaton No. PCT/CN2015/099885, dated Jul. 26, 2016.
(Continued)

*Primary Examiner* — Scott T Baderman
*Assistant Examiner* — Hassan Mrabi
(74) *Attorney, Agent, or Firm* — Finnegan, Henderson, Farabow, Garrett & Dunner LLP

(57) ABSTRACT

An icon position interchanging method includes receiving a first sliding signal triggered by a first dragging operation over a first icon and a second sliding signal triggered by a second dragging operation over a second icon, determining a first sliding vector according to the first sliding signal and a second sliding vector according to the second sliding signal, judging whether the first sliding signal and the second sliding signal satisfy a preset condition according to a first length of the first sliding vector and a second length of the second sliding vector, and performing position interchanging on the first icon and the second icon if the first sliding signal and the second sliding signal satisfy the preset condition.

9 Claims, 6 Drawing Sheets

(51) Int. Cl.
   *G06F 3/0481* (2013.01)
   *G06F 3/0488* (2013.01)

(56) References Cited

U.S. PATENT DOCUMENTS

| | | | |
|---|---|---|---|
| 2004/0192440 A1 | 9/2004 | Evans et al. | |
| 2007/0040813 A1* | 2/2007 | Kushler | G06F 3/0237 345/173 |
| 2009/0058821 A1 | 3/2009 | Chaudhri et al. | |
| 2010/0162160 A1 | 6/2010 | Stallings et al. | |
| 2010/0216448 A1* | 8/2010 | Jeon | G06F 3/04817 455/418 |
| 2011/0090165 A1* | 4/2011 | Oh | G06F 3/0488 345/173 |
| 2011/0252346 A1* | 10/2011 | Chaudhri | G06F 3/04817 715/765 |
| 2012/0081270 A1 | 4/2012 | Gimpl et al. | |
| 2012/0081271 A1 | 4/2012 | Gimpl et al. | |
| 2012/0081280 A1 | 4/2012 | Schrock et al. | |
| 2012/0081289 A1 | 4/2012 | Sirpal et al. | |
| 2012/0081292 A1 | 4/2012 | Sirpal et al. | |
| 2012/0081293 A1 | 4/2012 | Sirpal et al. | |
| 2012/0081311 A1 | 4/2012 | Sirpal et al. | |
| 2012/0081312 A1 | 4/2012 | Sirpal et al. | |
| 2012/0081313 A1 | 4/2012 | Sirpal et al. | |
| 2012/0081314 A1 | 4/2012 | Sirpal et al. | |
| 2012/0081315 A1 | 4/2012 | Sirpal et al. | |
| 2012/0081316 A1 | 4/2012 | Sirpal et al. | |
| 2012/0081317 A1 | 4/2012 | Sirpal et al. | |
| 2012/0081318 A1 | 4/2012 | Sirpal et al. | |
| 2012/0081319 A1 | 4/2012 | Gimpl et al. | |
| 2012/0081322 A1 | 4/2012 | Sirpal et al. | |
| 2012/0081323 A1 | 4/2012 | Sirpal et al. | |
| 2012/0081398 A1 | 4/2012 | Sirpal et al. | |
| 2012/0081399 A1 | 4/2012 | Sirpal et al. | |
| 2012/0081400 A1 | 4/2012 | Schrock et al. | |
| 2012/0081401 A1 | 4/2012 | Sirpal et al. | |
| 2012/0081403 A1 | 4/2012 | Sirpal et al. | |
| 2012/0081854 A1 | 4/2012 | Sirpal et al. | |
| 2012/0083319 A1 | 4/2012 | Sirpal et al. | |
| 2012/0084674 A1 | 4/2012 | Visosky | |
| 2012/0084675 A1 | 4/2012 | Sirpal et al. | |
| 2012/0084676 A1 | 4/2012 | de Paz | |
| 2012/0084677 A1 | 4/2012 | Sirpal et al. | |
| 2012/0084678 A1 | 4/2012 | Sirpal et al. | |
| 2012/0084679 A1 | 4/2012 | Sirpal et al. | |
| 2012/0084680 A1 | 4/2012 | Gimpl et al. | |
| 2012/0084681 A1 | 4/2012 | Cassar et al. | |
| 2012/0084682 A1 | 4/2012 | Sirpal et al. | |
| 2012/0084686 A1 | 4/2012 | Sirpal et al. | |
| 2012/0084687 A1 | 4/2012 | Sirpal et al. | |
| 2012/0084693 A1 | 4/2012 | Sirpal et al. | |
| 2012/0084694 A1 | 4/2012 | Sirpal et al. | |
| 2012/0084698 A1 | 4/2012 | Sirpal et al. | |
| 2012/0084699 A1 | 4/2012 | Sirpal et al. | |
| 2012/0084700 A1 | 4/2012 | Sirpal et al. | |
| 2012/0084701 A1 | 4/2012 | Sirpal et al. | |
| 2012/0084706 A1 | 4/2012 | Sirpal et al. | |
| 2012/0084709 A1 | 4/2012 | Sirpal et al. | |
| 2012/0084710 A1 | 4/2012 | Sirpal et al. | |
| 2012/0084712 A1 | 4/2012 | Gimpl et al. | |
| 2012/0084715 A1 | 4/2012 | Sirpal et al. | |
| 2012/0084716 A1 | 4/2012 | Sirpal et al. | |
| 2012/0084718 A1 | 4/2012 | Gimpl et al. | |
| 2012/0084720 A1 | 4/2012 | Sirpal et al. | |
| 2012/0084721 A1 | 4/2012 | Gimpl et al. | |
| 2012/0084722 A1 | 4/2012 | Cassar et al. | |
| 2012/0084723 A1 | 4/2012 | Reeves et al. | |
| 2012/0084724 A1 | 4/2012 | Sirpal et al. | |
| 2012/0084725 A1 | 4/2012 | Sirpal et al. | |
| 2012/0084726 A1 | 4/2012 | Sirpal et al. | |
| 2012/0084727 A1 | 4/2012 | Sirpal et al. | |
| 2012/0084739 A1 | 4/2012 | Sirpal et al. | |
| 2012/0124490 A1 | 5/2012 | Sirpal et al. | |
| 2012/0174028 A1 | 7/2012 | Sirpal et al. | |
| 2013/0222340 A1 | 8/2013 | Ito | |
| 2014/0068477 A1 | 3/2014 | Roh | |
| 2014/0237360 A1 | 8/2014 | Chaudhri et al. | |
| 2014/0320418 A1 | 10/2014 | Tseng et al. | |
| 2014/0380204 A1 | 12/2014 | Sirpal et al. | |
| 2015/0012853 A1 | 1/2015 | Chaudhri et al. | |
| 2015/0046851 A1 | 2/2015 | Sirpal et al. | |
| 2015/0070824 A1 | 3/2015 | Sirpal et al. | |
| 2015/0097797 A1 | 4/2015 | Sirpal et al. | |
| 2015/0106763 A1 | 4/2015 | Sirpal et al. | |
| 2015/0234544 A1 | 8/2015 | Sirpal et al. | |
| 2015/0234590 A1 | 8/2015 | Sirpal et al. | |
| 2015/0248214 A1* | 9/2015 | Gilger | G06F 3/04842 715/719 |
| 2015/0254805 A1 | 9/2015 | Sirpal et al. | |
| 2015/0365306 A1* | 12/2015 | Chaudhri | G06F 3/0416 715/736 |
| 2016/0041696 A1 | 2/2016 | Sirpal et al. | |
| 2016/0041697 A1 | 2/2016 | Sirpal et al. | |
| 2016/0041715 A1 | 2/2016 | Sirpal et al. | |
| 2016/0041756 A1 | 2/2016 | Sirpal et al. | |
| 2016/0048301 A1 | 2/2016 | Sirpal et al. | |
| 2016/0054902 A1 | 2/2016 | Sirpal et al. | |
| 2016/0057205 A1* | 2/2016 | Wang | G06F 3/04817 715/748 |
| 2016/0098121 A1 | 4/2016 | Sirpal et al. | |
| 2016/0103597 A1 | 4/2016 | Sirpal et al. | |
| 2016/0110049 A1 | 4/2016 | Sirpal et al. | |
| 2016/0110150 A1 | 4/2016 | Sirpal et al. | |
| 2016/0188204 A1 | 6/2016 | Sirpal et al. | |
| 2016/0196059 A1 | 7/2016 | Sirpal et al. | |
| 2016/0320921 A1 | 11/2016 | Sirpal et al. | |
| 2017/0046031 A1 | 2/2017 | Sirpal et al. | |
| 2017/0147198 A1* | 5/2017 | Herz | G06F 3/04883 |
| 2017/0277380 A1* | 9/2017 | Shan | G06F 3/0486 |

FOREIGN PATENT DOCUMENTS

| | | | |
|---|---|---|---|
| CN | 202110524 U | * | 1/2012 |
| CN | 202110524 U | | 1/2012 |
| CN | 103019547 A | | 4/2013 |
| CN | 103076945 A | * | 5/2013 |
| CN | 103076945 A | | 5/2013 |
| JP | 2013073466 A | | 4/2013 |
| JP | 2013178636 A | | 9/2013 |
| JP | 201300680 A | | 10/2013 |
| JP | 2014235526 A | | 12/2014 |
| RU | 2536799 C1 | | 12/2014 |
| WO | WO 2009/032750 A1 | | 3/2009 |

OTHER PUBLICATIONS

Notification of Reasons for Refusal dated Dec. 6, 2017, in counterpart Japanese Application No. 2016-552911 and English translation thereof.

Decision on Granting dated Sep. 28, 2017 of Russian Application No. 2016119486/08 and English translation thereof.

English version of International Search Report in International Application No. PCT/CN2015/099885, dated Jul. 26, 2016.

Extended European Search Report for Application No. 16166898. 3-1507, from the European Patent Office, dated May 2, 2017.

Office Action in counterpart Chinese Application No. 201510745112.4, dated Jan. 4, 2018.

Office Action in counterpart Japanese Application No. 2016-552911, dated Apr. 3, 2018.

\* cited by examiner

METHOD, DEVICE AND STORAGE MEDIUM FOR INTERCHANGING ICON POSITIONS

CROSS-REFERENCE TO RELATED APPLICATIONS

This application is based upon and claims priority to Chinese Patent Application No. 201510745112.4, filed on Nov. 5, 2015, the entire contents of which are incorporated herein by reference.

TECHNICAL FIELD

The present disclosure relates to terminals and, more particularly, to a method, device, and storage medium for interchanging icon positions.

BACKGROUND

In conventional technologies, to help a user of a terminal manage application program icons, display positions of the icons can be set by the user according to the user's need by using a touch screen of the terminal. For example, the user can slide an icon to change the icon's position.

SUMMARY

In accordance with the present disclosure, there is provided an icon position interchanging method including receiving a first sliding signal triggered by a first dragging operation over a first icon and a second sliding signal triggered by a second dragging operation over a second icon, determining a first sliding vector according to the first sliding signal and a second sliding vector according to the second sliding signal, judging whether the first sliding signal and the second sliding signal satisfy a preset condition according to a first length of the first sliding vector and a second length of the second sliding vector, and performing position interchanging on the first icon and the second icon if the first sliding signal and the second sliding signal satisfy the preset condition.

Also in accordance with the present disclosure, there is provided an icon position interchanging method including receiving a first sliding signal triggered by a first dragging operation over a first icon and a second sliding signal triggered by a second dragging operation over a second icon, determining a first sliding vector according to the first sliding signal and a second sliding vector according to the second sliding signal, and judging whether the first sliding signal and the second sliding signal are opposite-movement sliding signals indicating the first dragging operation and the second dragging operation involve opposite movements according to a direction of the first sliding vector and a direction of the second sliding vector. If the first sliding signal and the second sliding signal are opposite-movement sliding signals, the method also includes judging whether the first sliding signal and the second sliding signal satisfy a preset condition according to a first length of the first sliding vector and a second length of the second sliding vector. If the first sliding signal and the second sliding signal satisfy the preset condition, the method further includes performing position interchanging on the first icon and the second icon. If the first sliding signal and the second sliding signal are not opposite-movement sliding signals, the method also includes stopping icon position interchanging.

Also in accordance with the present disclosure, there is provided an icon position interchanging device including a processor and a memory storing instructions that, when executed by the processor, cause the processor to receive a first sliding signal triggered by a first dragging operation over a first icon and a second sliding signal triggered by a second dragging operation over a second icon, determine a first sliding vector according to the first sliding signal and a second sliding vector according to the second sliding signal, judge whether the first sliding signal and the second sliding signal satisfy a preset condition according to a first length of the first sliding vector and a second length of the second sliding vector, and perform position interchanging on the first icon and the second icon if the first sliding signal and the second sliding signal satisfy the preset condition.

Also in accordance with the present disclosure, there is provided an icon position interchanging device including a processor and a memory storing instructions that, when executed by the processor, cause the processor to receive a first sliding signal triggered by a first dragging operation over a first icon and a second sliding signal triggered by a second dragging operation over a second icon, determine a first sliding vector according to the first sliding signal and a second sliding vector according to the second sliding signal, and judge whether the first sliding signal and the second sliding signal are opposite-movement sliding signals indicating the first dragging operation and the second dragging operation involve opposite movements according to a direction of the first sliding vector and a direction of the second sliding vector. If the first sliding signal and the second sliding signal are opposite-movement sliding signals, the instructions also cause the processor to judge whether the first sliding signal and the second sliding signal satisfy a preset condition according to a first length of the first sliding vector and a second length of the second sliding vector. If the first sliding signal and the second sliding signal satisfy the preset condition, the instructions further cause the processor to perform position interchanging on the first icon and the second icon. If the first sliding signal and the second sliding signal are not opposite-movement sliding signals, the instructions also cause the processor to stop icon position interchanging.

Also in accordance with the present disclosure, there is provided a non-transitory computer-readable storage medium having stored therein instructions that, when executed by a processor of a mobile terminal, causes the mobile terminal to receive a first sliding signal triggered by a first dragging operation over a first icon and a second sliding signal triggered by a second dragging operation over a second icon, determine a first sliding vector according to the first sliding signal and a second sliding vector according to the second sliding signal, judge whether the first sliding signal and the second sliding signal satisfy a preset condition according to a first length of the first sliding vector and a second length of the second sliding vector, and perform position interchanging on the first icon and the second icon if the first sliding signal and the second sliding signal satisfy the preset condition.

It should be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodi

DETAILED DESCRIPTION

Embodiments of the present disclosure will be described below in detail with reference to the accompanying drawings.

Figure 1:
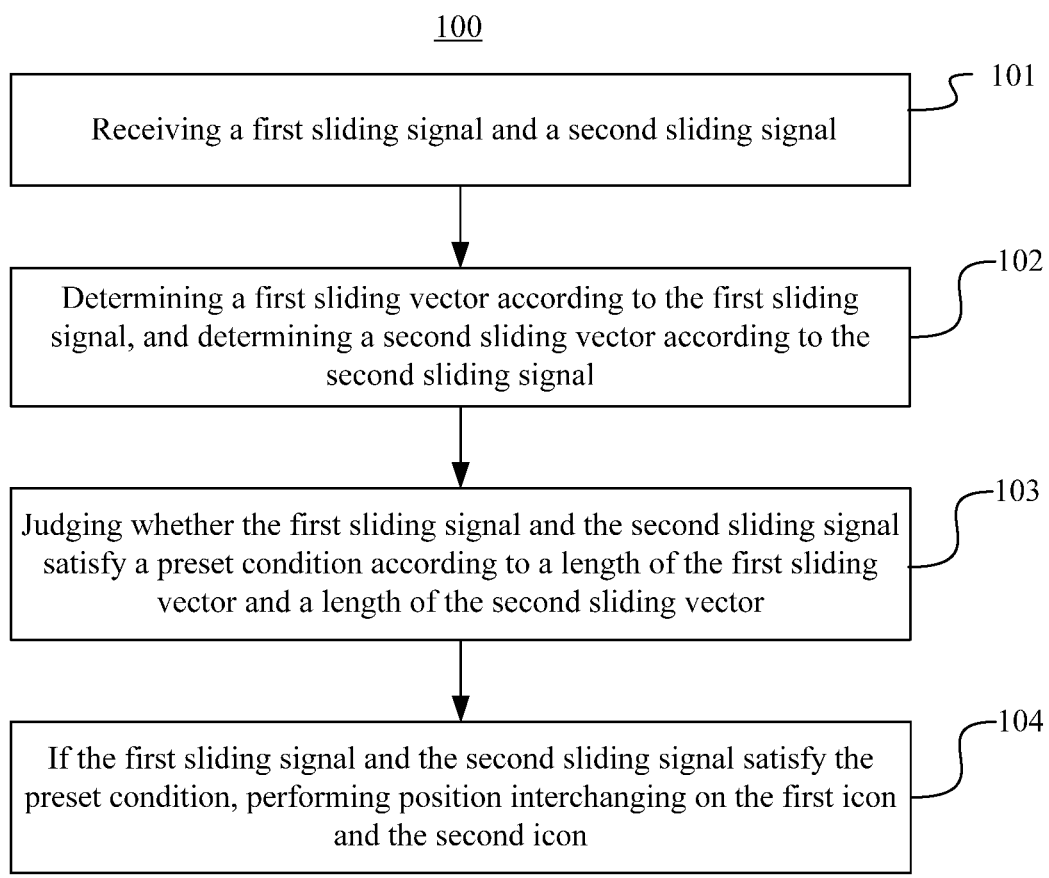
- FIG. 1 is a flow chart showing an icon position interchanging method according to an exemplary embodiment.

FIG. 1 is a flow chart showing an icon position interchanging method 100 according to an exemplary embodiment. As shown in FIG. 1, at 101, a first sliding signal and a second sliding signal are received. The first sliding signal is triggered by a first dragging operation over a first icon and the second sliding signal is triggered by a second dragging operation over a second icon. At 102, a first sliding vector is determined according to the first sliding signal, and a second sliding vector is determined according to the second sliding signal. At 103, it is judged whether the first sliding signal and the second sliding signal satisfy a preset condition according to a length of the first sliding vector and a length of the second sliding vector. At 104, if the first sliding signal and the second sliding signal satisfy the preset condition, position interchanging is performed on the first icon and the second icon.

In some embodiments, to determine the first sliding vector according to the first sliding signal, an initial position of the first dragging operation is determined as a starting point of the first sliding vector, and a stop position of the first dragging operation is determined as an endpoint of the first sliding vector. Similarly, to determine the second sliding vector according to the second sliding signal, an initial position of the second dragging operation is determined as a starting point of the second sliding vector, and a stop position of the second dragging operation is determined as an endpoint of the second sliding vector.

The first and second icons are displayed in an interface. In some embodiments, to judge whether the first sliding signal and the second sliding signal satisfy the preset condition according to the length of the first sliding vector and the length of the second sliding vector, a distance between a display position of the first icon on the interface and a display position of the second icon on the interface is acquired. Such a distance is also referred to as a "display position distance." If a numerical relationship among the display position distance, the length of the first sliding vector, and the length of the second sliding vector satisfies at least one preset numerical relationship, then it is determined that the first sliding signal and the second sliding signal satisfy the preset condition. The at least one preset numerical relationship includes at least one of a ratio of the length of the first sliding vector to the display position distance exceeding a first preset value, a ratio of the length of the second sliding vector to the display position distance exceeding a second preset value, or a ratio of a sum of the length of the first sliding vector and the length of the second sliding vector to the display position distance exceeding a third preset value.

In some embodiments, before judging whether the first sliding signal and the second sliding signal satisfy the preset condition, it is judged whether the first sliding signal and the second sliding signal are sliding signals indicating the first and second dragging operations involve opposite movements according to a direction of the first sliding vector and a direction of the second sliding vector. Sliding signals indicating opposite movements are also referred to herein as "opposite-movement sliding signals." If the first sliding signal and the second sliding signal are opposite-movement sliding signals, the process of judging whether the first sliding signal and the second sliding signal satisfy the preset condition is executed. On the other hand, if the first sliding signal and the second sliding signal are not opposite-movement sliding signals, the positions of the first and second icons are not interchanged.

In some embodiments, to judge whether the first sliding signal and the second sliding signal are opposite-movement sliding signals, a line connecting the display position of the first icon and the display position of the second icon is determined as a reference line. An angle between the direction of the first sliding vector and the reference line is acquired as a first angle, and an angle between the direction of the second sliding vector and the reference line is acquired as a second angle. If the first angle is within a first preset angle range and the second angle is within a second preset angle range, then it is determined that the first sliding signal and the second sliding signal are opposite-movement sliding signals.

Figure 2:
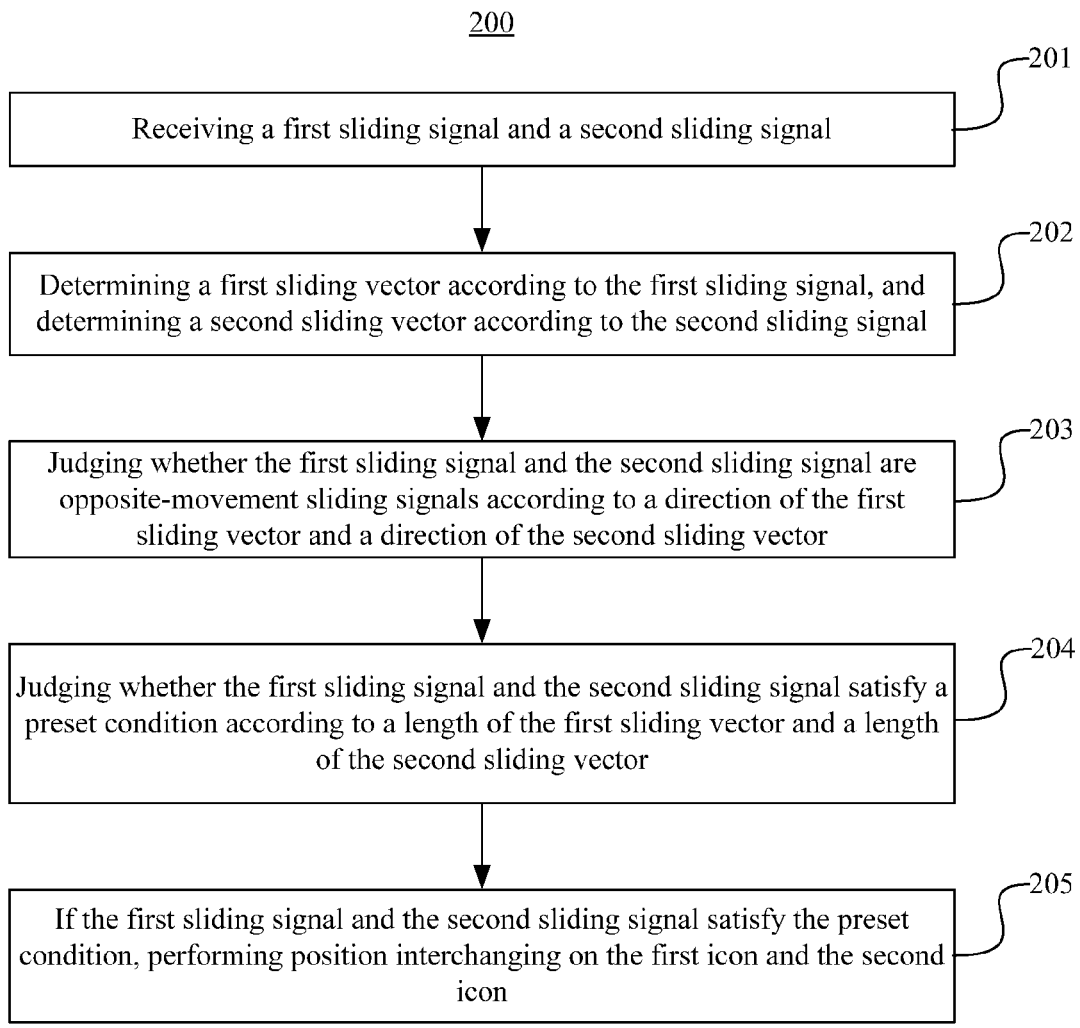
FIG. 2 is a flow chart showing an icon position interchanging method according to another exemplary embodiment.

FIG. 2 is a flow chart showing an icon position interchanging method 200 according to another exemplary embodiment. The method 200 can be implemented, for example, in a terminal. As shown in FIG. 2, at 201, a first sliding signal and a second sliding signal are received. The first sliding signal is triggered by a first dragging operation over a first icon and the second sliding signal is triggered by a second dragging operation over a second icon.

In some embodiments, a user performs the dragging operations on a touch screen of the terminal to trigger the sliding signals. The touch screen can be, for example, a capacitive touch screen. When the user touches the capacitive touch screen with a finger, a coupling capacitance is formed at a contact point at which the finger contacts the capacitive touch screen. A high-frequency current is generated between the coupling capacitance and each of a plurality of electrodes at different positions. An intensity of the high-frequency current is proportional to a distance between the contact point and the corresponding electrode. Therefore, a position coordinate of the contact point can be determined by measuring the intensity of the high-frequency current generated in each of the plurality of electrodes to determine the distance between the contact point and the electrode. If the position coordinate of the contact point corresponds to a display position of an icon, it is considered that the contact is associated with an operation over the icon. If the finger executes a dragging operation from the contact point, the contact point on the capacitive touch screen will continuously change, and the position coordinate of the contact point will also continuously changed. Therefore, when the position coordinate of the contact point continuously changes, a sliding signal is triggered.

In some embodiments, the touch screen can be another type of touch screen, such as a resistance type, an infrared type, or a surface acoustic wave type. Moreover, the sliding signal can also be triggered by a dragging operation executed with another device, such as a stylus.

Triggering of the first sliding signal and the second sliding signal can be synchronously detected based on a multi-touch technology. In some embodiments, the first sliding signal and the second sliding signal are considered to be simultaneously triggered if a time interval between a triggering time of the first sliding signal and a triggering time of the second sliding signal is smaller than a preset value.

At 202, a first sliding vector is determined according to the first sliding signal, and a second sliding vector is determined according to the second sliding signal. Each of the sliding vectors is configured to indicate a length and a direction of the corresponding dragging operation that triggers the corresponding sliding signal.

In some embodiments, an initial position of the first dragging operation is determined as a starting point of the first sliding vector, and a stop position of the first dragging operation is determined as an endpoint of the first sliding vector. Similarly, an initial position of the second dragging operation is determined as a starting point of the second sliding vector, and a stop position of the second dragging operation is determined as an endpoint of the second sliding vector.

For example, if the user uses the finger to perform a dragging operation on a touch screen, the position at which the finger starts contacting the touch screen is the initial position of the dragging operation. Then the user slides the finger on the touch screen while keeping the finger in contact with the touch screen. When the finger leaves the touch screen, the position at which the finger leaves the touch screen is the stop position of the dragging operation.

At 203, it is judged whether the first sliding signal and the second sliding signal are opposite-movement sliding signals according to the direction of the first sliding vector and the direction of the second sliding vector. Opposite-movement sliding signals refer to two sliding signals whose corresponding dragging operations have opposite dragging directions. If the first sliding signal and the second sliding signal are opposite-movement sliding signals, process 204 is executed. On the other hand, if the first sliding signal and the second sliding signal are not opposite-movement sliding signals, the positions of the first and second icons are not interchanged.

In some embodiments, to determine whether the first and second sliding signals are opposite-movement sliding signals, a line connecting a display position of the first icon and a display position of the second icon is determined as a reference line. An angle between the direction of the first sliding vector and the reference line is acquired as a first angle, and an angle between the direction of the second sliding vector and the reference line is acquired as a second angle. For example, as shown in FIG. 3, an icon can occupy a region, and the display position of the icon can be a point in the region, such as a central point or a vertex angle point of the region.

Figure 3:
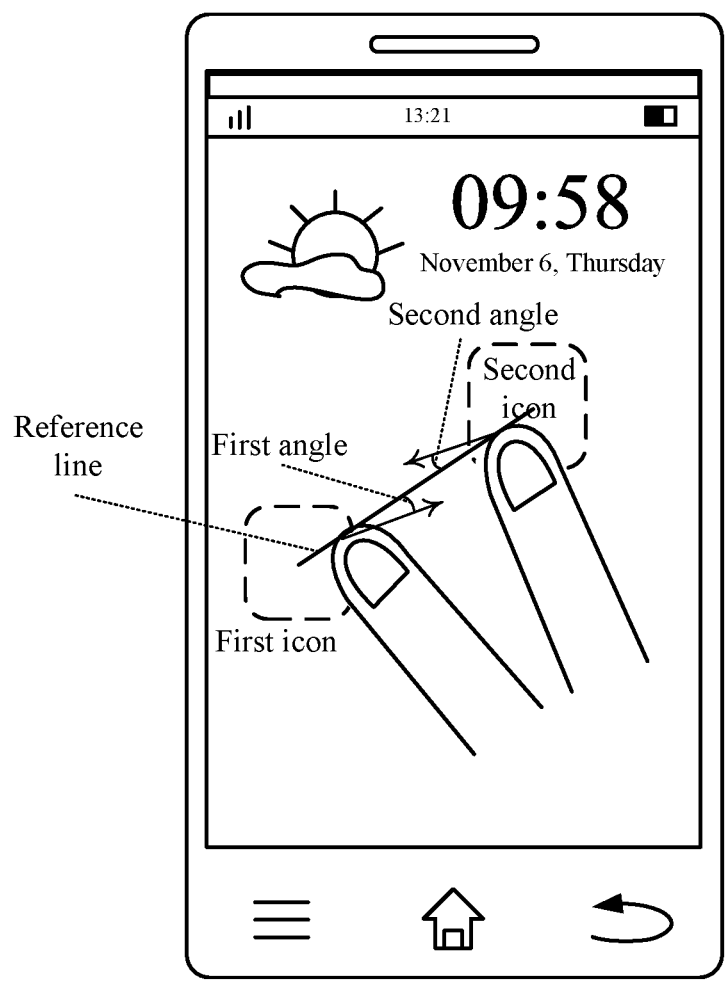
FIG. 3 is a schematic diagram illustrating operations during icon position interchanging according to an exemplary embodiment.

More particularly, FIG. 3 schematically illustrates the first and second icons, the reference line, and the first and second angles. In some embodiments, if the first angle is within a first preset angle range and the second angle is within a second preset angle range, it is determined that the first sliding signal and the second sliding signal are opposite-movement sliding signals. The first and second preset angle ranges can be set according to a practical condition. For example, the first preset angle range can be from about +15 degrees to about −15 degrees. Then, for example, if the first angle is −11 degrees, the first angle is determined to be within the first preset angle range. According to the present disclosure, the first and second angles can be different from or the same as each other, and the first and second angle ranges can also be different from or the same as each other. In some embodiments, the first and second dragging operations can be performed by two different fingers.

At 204, it is judged whether the first sliding signal and the second sliding signal satisfy a preset condition according to a length of the first sliding vector and a length of the second sliding vector. If the first and second sliding signals satisfy the preset condition, process 205 is executed.

Figure 4:
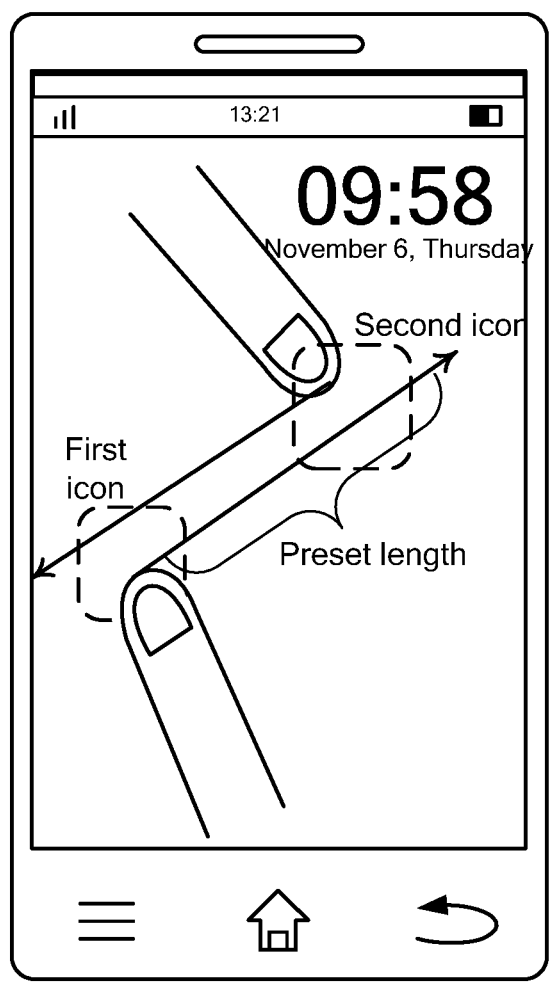
FIG. 4 is a schematic diagram illustrating operations during icon position interchanging according to another exemplary embodiment.

Various conditions may be set. However, if the preset condition only includes whether the lengths of the first and second vectors are longer than a preset length, then if the preset length is too long, it is inconvenient for the user to perform dragging operations that satisfy the preset condition. For example, FIG. 4 schematically illustrates the first and second icons, the preset length, and the dragging operations that are required to have a vector length longer than the preset length. As shown in FIG. 4, when the preset length is too long, the user cannot perform the dragging operations that satisfy the preset condition with two fingers of the same hand. Alternatively, if the preset length is too short, a random dragging operation may more likely be recognized incorrectly as an operation for interchanging the positions of two icons.

Therefore, in some embodiments, a display position distance between the display position of the first icon and the display position of the second icon is acquired. When a numerical relationship among the display position distance, the length of the first sliding vector, and the length of the second sliding vector satisfies at least one preset numerical relationship, it is determined that the first sliding signal and the second sliding signal satisfy the preset condition. The at least one preset numerical relationship can include at least one of the following three numerical relationships.

Numerical relationship 1: a ratio of the length of the first sliding vector to the display position distance exceeds a first preset value.

Numerical relationship 2: a ratio of the length of the second sliding vector to the display position distance exceeds a second preset value.

Numerical relationship 3: a ratio of a sum of the length of the first sliding vector and the length of the second sliding vector to the display position distance exceeds a third preset value.

The above first preset value, second preset value, and third preset value can be set according to practical application conditions. For example, the first preset value and the second preset value can be set to be the same as or different from each other. In some embodiments, the third preset value is larger than each of the first preset value and the second preset value.

The numerical relationships 1 to 3 can be used individually or combined with each other. For example, in the scenario that the numerical relationships 1 to 3 are all used in the preset condition, the first and second sliding signals satisfy the preset condition if: the ratio of the length of the first sliding vector to the display position distance exceeds the first preset value, the ratio of the length of the second sliding vector to the display position distance exceeds the second preset value, and the ratio of the sum of the length of the first sliding vector and the length of the second sliding vector to the display position distance exceeds the third preset value.

Other preset numerical relationships can also be used, such as the sum of the lengths of the sliding vectors exceeds the display position distance between the first and second icons.

At 205, if the first sliding signal and the second sliding signal satisfy the preset condition, position interchanging is performed on the first icon and the second icon. To interchange the positions of the first icon and the second icon, a display refreshing instruction containing interchanging information is issued. The interchanging information indicates interchange of display position information of the first icon and display position information of the second icon. The display refreshing instruction enables the display screen to display a refreshed display interface after the display positions are interchanged. In some embodiments, the display position information of the first icon and the display position information of the second icon stored in a memory are also interchanged so that when the terminal starts again, the first icon and second icon are displayed at new positions after the interchange.

Figure 5:
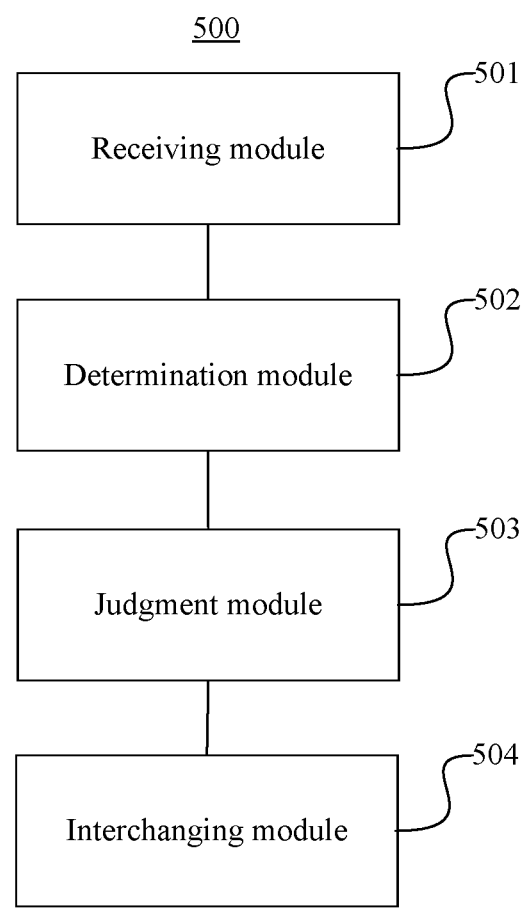
FIG. 5 is a block diagram illustrating an icon position interchanging device according to an exemplary embodiment.

FIG. 5 is a block diagram illustrating an icon position interchanging device 500 according to an exemplary embodiment. Referring to FIG. 5, the device 500 includes a receiving module 501, a determination module 502, a judgment module 503, and an interchanging module 504. The receiving module 501 is configured to receive a first sliding signal and a second sliding signal. The first sliding signal is triggered by a first dragging operation over a first icon and the second sliding signal is triggered by a second dragging operation over a second icon. The determination module 502 is configured to determine a first sliding vector according to the first sliding signal, and determine a second sliding vector according to the second sliding signal. The judgment module 503 is configured to judge whether the first sliding signal and the second sliding signal satisfy a preset condition according to a length of the first sliding vector and a length of the second sliding vector. The interchanging module 504 is configured to, if the first sliding signal and the second sliding signal satisfy the preset condition, perform position interchanging on the first icon and the second icon.

In some embodiments, the determination module 502 is further configured to determine an initial position of the first dragging operation as a starting point of the first sliding vector and a stop position of the first dragging operation as an endpoint of the first sliding vector, and determine an initial position of the second dragging operation as a starting point of the second sliding vector and a stop position of the second dragging operation as an endpoint of the second sliding vector.

In some embodiments, the judgment module 503 is further configured to acquire a display position distance between a display position of the first icon and a display position of the second icon and, when a numerical relationship among the display position distance, the length of the first sliding vector, and the length of the second sliding vector satisfies at least one preset numerical relationship, determine that the first sliding signal and the second sliding signal satisfy the preset condition. The at least one preset numerical relationship includes at least one of a ratio of the length of the first sliding vector to the display position distance exceeding a first preset value, a ratio of the length of the second sliding vector to the display position distance exceeding a second preset value, and a ratio of a sum of the length of the first sliding vector and the length of the second sliding vector to the display position distance exceeding a third preset value.

In some embodiments, the judgment module 503 is further configured to judge whether the first sliding signal and the second sliding signal are opposite-movement sliding signals according to a direction of the first sliding vector and a direction of the second sliding vector. If the first sliding signal and the second sliding signal are opposite-movement sliding signals, the judgment module 503 further judges whether the first sliding signal and the second sliding signal satisfy the preset condition. If the first sliding signal and the second sliding signal are not opposite-movement sliding signals, the icon position interchanging is not performed.

In some embodiments, the judgment module 503 is further configured to determine a line connecting the display position of the first icon and the display position of the second icon as a reference line, acquire an angle between the direction of the first sliding vector and the reference line as a first angle and an angle between the direction of the second sliding vector and the reference line as a second angle, and when the first angle is within a first preset angle range and the second angle is within a second preset angle range, determine that the first sliding signal and the second sliding signal are opposite-movement sliding signals.

Figure 6:
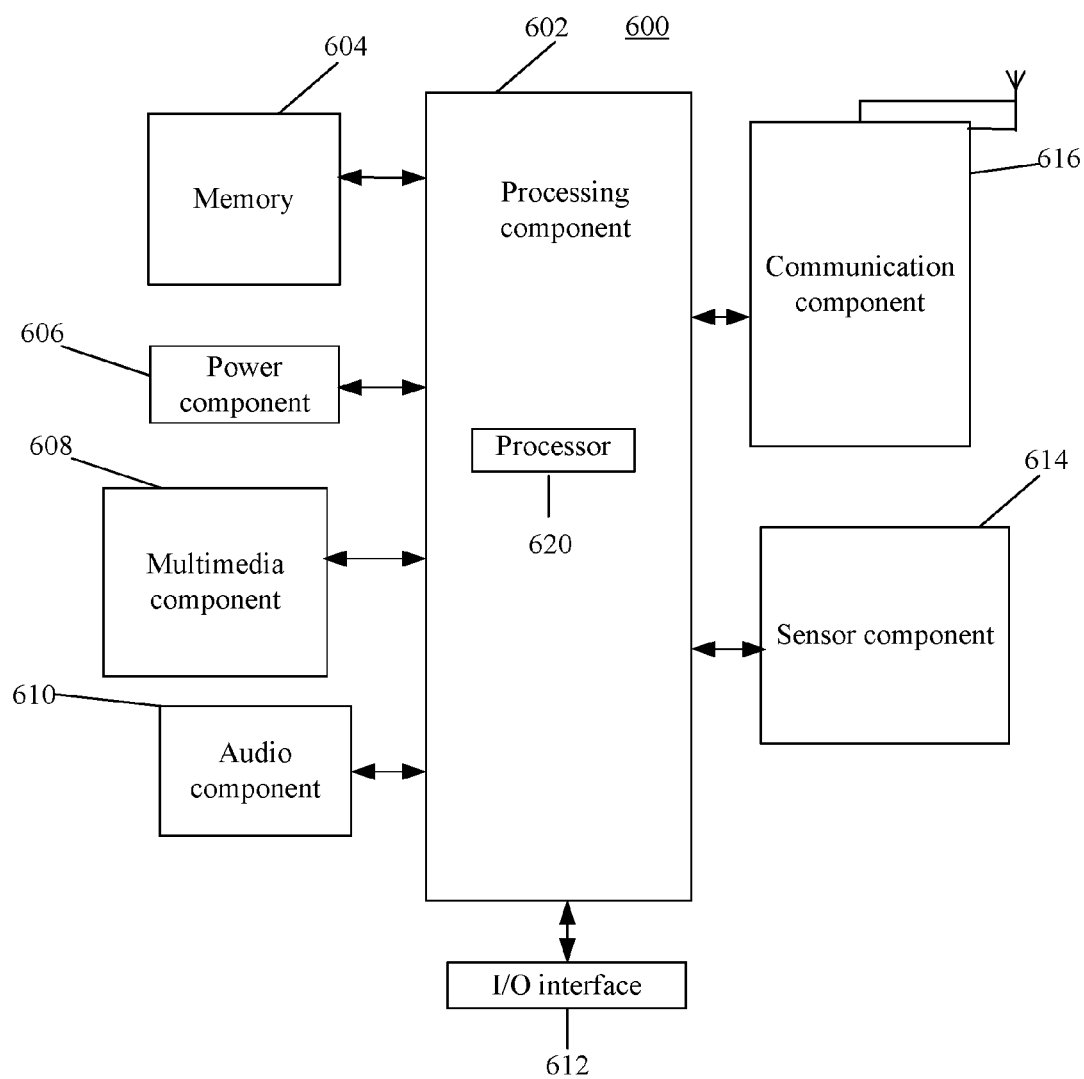
FIG. 6 is a block diagram illustrating an icon position interchanging device according to another exemplary embodiment.

FIG. 6 is a block diagram illustrating an icon position interchanging device 600 according to another exemplary embodiment. For example, the device 600 may be a mobile phone, a computer, a digital broadcast terminal, a messaging device, a gaming console, a tablet, a medical device, exercise equipment, a personal digital assistant, or the like.

Referring to FIG. 6, the device 600 includes one or more of the following components: a processing component 602, a memory 604, a power component 606, a multimedia component 608, an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the abovementioned methods. Moreover, the processing component 602 may include one or more modules which facilitate interaction between the processing component 602 and other components. For instance, the processing component 602 may include a multimedia module to facilitate interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 606 provides power for various components of the device 600. The power component 606 may include a power management system, one or more power supplies, and other components associated with the generation, management and distribution of power for the device 600.

The multimedia component 608 includes a screen providing an output interface between the device 600 and the user. In some embodiments, the screen may include a Liquid Crystal Display (LCD) and a Touch Panel. If the screen includes the Touch Panel, the screen may be implemented as a touch screen to receive an input signal from the user. The Touch Panel includes one or more touch sensors to sense touches, swipes and gestures on the Touch Panel. The touch sensors may not only sense a boundary of a touch or swipe action, but also sense a period of time and pressure associated with the touch or swipe action. In some embodiments, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focus and optical zoom capabilities.

The audio component 610 is configured to output and/or input an audio signal. For example, the audio component 610 includes a microphone configured to receive an external audio signal when the device 600 is in the operation mode, such as a call mode, a recording mode and a voice recognition mode. The received audio signal may be further stored in the memory 604 or transmitted via the communication component 616. In some embodiments, the audio component 610 further includes a speaker configured to output an audio signal.

The I/O interface 612 provides an interface between the processing component 602 and a peripheral interface module, such as a keyboard, a click wheel, a button, or the like. The button may include, but is not limited to, a home button, a volume button, a starting button, or a locking button.

The sensor component 614 includes one or more sensors configured to provide status assessment of various aspects for the device 600. For instance, the sensor component 614 may detect an on/off status of the device 600, relative positioning of components, such as a display and small keyboard of the device 600, a change in a position of the device 600 or a component of the device 600, presence or absence of contact between the user and the device 600, orientation or acceleration/deceleration of the device 600 and a change in temperature of the device 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wired or wireless communication between the device 600 and other devices. The device 600 may access a communication-standard-based wireless network, such as a Wireless Fidelity (WiFi) network, a 2nd-Generation (2G), 3rd-Generation (3G), or 4th-Generation (4G) network, or a combination thereof. In an exemplary embodiment, the communication component 616 receives a broadcast signal or broadcast associated information from an external broadcast management system through a broadcast channel. In an exemplary embodiment, the communication component 616 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BlueTooth technology and other technologies.

In the exemplary embodiment, the device 600 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute an icon position interchanging method consistent with the present disclosure, such as one of the exemplary methods described above in connection with FIGS. 1 and 2.

According to the present disclosure, there is also provided a non-transitory computer-readable storage medium including instructions, such as included in the memory 604, executable by the processor 620 in the device 600 to implement a method consistent with the present disclosure, such as one of the exemplary methods described above in connection with FIGS. 1 and 2. For example, the non-transitory computer-readable storage medium may be a ROM, a Compact Disc Read-Only Memory (CD-ROM), a magnetic tape, a floppy disc, an optical data storage device, or the like.

According to the present disclosure, there is also provided a non-transitory computer-readable storage medium, and when the instructions in the storage medium are executed by the processor of a terminal, the terminal executes an icon position interchanging method consistent with the present disclosure, such as one of the exemplary methods described above in connection with FIGS. 1 and 2.

According to the present disclosure, positions of two icons are only interchanged when sliding signals associated with the two icons satisfy a preset condition. Therefore, a random dragging operation will not be mistakenly recognized as an icon position interchanging operation. As such, the accuracy of recognizing an icon position interchanging operation is improved.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the precise structures that have been described above and illustrated in the accompanying drawings, and that various modifications and changes may be made without departing from the scope thereof. It is intended that the scope of the present disclosure only be limited by the appended claims.

What is claimed is:
1. An icon position interchanging method, comprising:
  receiving a first sliding signal and a second sliding signal, the first sliding signal being triggered by a first dragging operation over a first icon and the second sliding signal being triggered by a second dragging operation over a second icon;

determining a first sliding vector according to the first sliding signal and a second sliding vector according to the second sliding signal;

judging whether the first sliding signal and the second sliding signal satisfy a preset condition according to a first length of the first sliding vector and a second length of the second sliding vector; and performing, if the first sliding signal and the second sliding signal satisfy the preset condition, position interchanging on the first icon and the second icon;

wherein judging whether the first sliding signal and the second sliding signal satisfy the preset condition includes:

acquiring a display position distance between a display position of the first icon and a display position of the second icon;

determining whether the display position distance, the first length, and the second length satisfy a numerical relationship; and determining, if the display position distance, the first length, and the second length satisfy the numerical relationship, that the first sliding signal and the second sliding signal satisfy the preset condition;

wherein determining whether the display position distance, the first length, and the second length satisfy the numerical relationship includes determining whether the display position distance, the first length, and the second length satisfy at least one of following relationships:

a ratio of the first length to the display position distance exceeds a first preset value;

a ratio of the second length to the display position distance exceeds a second preset value; or a ratio of a sum of the first length and the second length to the display position distance exceeds a third preset value.

2. The method according to claim 1, wherein determining the first sliding vector and the second sliding vector includes:

determining an initial position of the first dragging operation as a starting point of the first sliding vector and a stop position of the first dragging operation as an endpoint of the first sliding vector; and determining an initial position of the second dragging operation as a starting point of the second sliding vector and a stop position of the second dragging operation as an endpoint of the second sliding vector.

3. An icon position interchanging method, comprising:

receiving a first sliding signal and a second sliding signal, the first sliding signal being triggered by a first dragging operation over a first icon and the second sliding signal being triggered by a second dragging operation over a second icon;

determining a first sliding vector according to the first sliding signal and a second sliding vector according to the second sliding signal;

judging whether the first sliding signal and the second sliding signal are opposite-movement sliding signals indicating the first dragging operation and the second dragging operation involve opposite movements, according to a direction of the first sliding vector and a direction of the second sliding vector;

if the first sliding signal and the second sliding signal are opposite-movement sliding signals:

judging whether the first sliding signal and the second sliding signal satisfy a preset condition according to a first length of the first sliding vector and a second length of the second sliding vector; and performing, if the first sliding signal and the second sliding signal satisfy the preset condition, position interchanging on the first icon and the second icon; and if the first sliding signal and the second sliding signal are not opposite-movement sliding signals:

stopping icon position interchanging;

wherein judging whether the first sliding signal and the second sliding signal satisfy the preset condition includes:

acquiring a display position distance between a display position of the first icon and a display position of the second icon;

determining whether the display position distance, the first length, and the second length satisfy a numerical relationship; and determining, if the display position distance, the first length, and the second length satisfy the numerical relationship, that the first sliding signal and the second sliding signal satisfy the preset condition;

wherein determining whether the display position distance, the first length, and the second length satisfy the numerical relationship includes determining whether the display position distance, the first length, and the second length satisfy at least one of following relationships:

a ratio of the first length to the display position distance exceeds a first preset value;

a ratio of the second length to the display position distance exceeds a second preset value; or a ratio of a sum of the first length and the second length to the display position distance exceeds a third preset value.

4. The method according to claim 3, wherein judging whether the first sliding signal and the second sliding signal are opposite-movement sliding signals includes:

determining a line connecting a display position of the first icon and a display position of the second icon as a reference line;

acquiring an angle between the direction of the first sliding vector and the reference line as a first angle, and an angle between the direction of the second sliding vector and the reference line as a second angle; and determining, when the first angle is within a first preset angle range and the second angle is within a second preset angle range, that the first sliding signal and the second sliding signal are opposite-movement sliding signals.

5. An icon position interchanging device, comprising:

a processor; and a memory storing instructions that, when executed by the processor, cause the processor to:

receive a first sliding signal and a second sliding signal, the first sliding signal being triggered by a first dragging operation over a first icon and the second sliding signal being triggered by a second dragging operation over a second icon;

determine a first sliding vector according to the first sliding signal and a second sliding vector according to the second sliding signal;

judge whether the first sliding signal and the second sliding signal satisfy a preset condition according to a first length of the first sliding vector and a second length of the second sliding vector; and perform, if the first sliding signal and the second sliding signal satisfy the preset condition, position interchanging on the first icon and the second icon;
wherein, in judging whether the first sliding signal and the second sliding signal satisfy the preset condition, the instructions further cause the processor to:
acquire a display position distance between a display position of the first icon and a display position of the second icon;
determine whether the display position distance, the first length, and the second length satisfy a numerical relationship; and
determine, if the display position distance, the first length, and the second length satisfy the numerical relationship, that the first sliding signal and the second sliding signal satisfy the preset condition;
wherein determining whether the display position distance, the first length, and the second length satisfy the numerical relationship includes determining whether the display position distance, the first length, and the second length satisfy at least one of following relationships:
a ratio of the first length to the display position distance exceeds a first preset value;
a ratio of the second length to the display position distance exceeds a second preset value; or
a ratio of a sum of the first length and the second length to the display position distance exceeds a third preset value.

6. The device according to claim 5, wherein the instructions further cause the processor to:
determine an initial position of the first dragging operation as a starting point of the first sliding vector and a stop position of the first dragging operation as an endpoint of the first sliding vector; and
determine an initial position of the second dragging operation as a starting point of the second sliding vector and a stop position of the second dragging operation as an endpoint of the second sliding vector.

7. An icon position interchanging device, comprising:
a processor; and
a memory storing instructions that, when executed by the processor, cause the processor to:
receive a first sliding signal and a second sliding signal, the first sliding signal being triggered by a first dragging operation over a first icon and the second sliding signal being triggered by a second dragging operation over a second icon;
determine a first sliding vector according to the first sliding signal and a second sliding vector according to the second sliding signal;
judge whether the first sliding signal and the second sliding signal are opposite-movement sliding signals indicating the first dragging operation and the second dragging operation involve opposite movements, according to a direction of the first sliding vector and a direction of the second sliding vector;
if the first sliding signal and the second sliding signal are opposite-movement sliding signals:
judge whether the first sliding signal and the second sliding signal satisfy a preset condition according to a first length of the first sliding vector and a second length of the second sliding vector; and
perform, if the first sliding signal and the second sliding signal satisfy the preset condition, position interchanging on the first icon and the second icon; and if the first sliding signal and the second sliding signal are not opposite-movement sliding signals:
stop icon position interchanging;
wherein, in judging whether the first sliding signal and the second sliding signal satisfy the preset condition, the instructions further cause the processor to:
acquire a display position distance between a display position of the first icon and a display position of the second icon;
determine whether the display position distance, the first length, and the second length satisfy a numerical relationship; and
determine, if the display position distance, the first length, and the second length satisfy the numerical relationship, that the first sliding signal and the second sliding signal satisfy the preset condition;
wherein determining whether the display position distance, the first length, and the second length satisfy the numerical relationship includes determining whether the display position distance, the first length, and the second length satisfy at least one of following relationships:
a ratio of the first length to the display position distance exceeds a first preset value;
a ratio of the second length to the display position distance exceeds a second preset value; or
a ratio of a sum of the first length and the second length to the display position distance exceeds a third preset value.

8. The device according to claim 7, wherein the instructions further cause the processor to:
determine a line connecting a display position of the first icon and a display position of the second icon as a reference line;
acquire an angle between the direction of the first sliding vector and the reference line as a first angle, and an angle between the direction of the second sliding vector and the reference line as a second angle; and
determine, when the first angle is within a first preset angle range and the second angle is within a second preset angle range, that the first sliding signal and the second sliding signal are opposite-movement sliding signals.

9. A non-transitory computer-readable storage medium having stored therein instructions that, when executed by a processor of a mobile terminal, causes the mobile terminal to:
receive a first sliding signal and a second sliding signal, the first sliding signal being triggered by a first dragging operation over a first icon and the second sliding signal being triggered by a second dragging operation over a second icon;
determine a first sliding vector according to the first sliding signal and a second sliding vector according to the second sliding signal;
judge whether the first sliding signal and the second sliding signal satisfy a preset condition according to a first length of the first sliding vector and a second length of the second sliding vector; and
perform, if the first sliding signal and the second sliding signal satisfy the preset condition, position interchanging on the first icon and the second icon;
wherein judging whether the first sliding signal and the second sliding signal satisfy the preset condition includes:

acquiring a display position distance between a display position of the first icon and a display position of the second icon;

determining whether the display position distance, the first length, and the second length satisfy a numerical relationship; and determining, if the display position distance, the first length, and the second length satisfy the numerical relationship, that the first sliding signal and the second sliding signal satisfy the preset condition;

wherein determining whether the display position distance, the first length, and the second length satisfy the numerical relationship includes determining whether the display position distance, the first length, and the second length satisfy at least one of following relationships:

a ratio of the first length to the display position distance exceeds a first preset value;

a ratio of the second length to the display position distance exceeds a second preset value; or a ratio of a sum of the first length and the second length to the display position distance exceeds a third preset value.

* * * * *